_US005227702A_

United States Patent [19]

Nahirney

[11] Patent Number: 5,227,702
[45] Date of Patent: Jul. 13, 1993

[54] DIRECT CURRENT MOTOR UTILIZING BACK ELECTROMOTIVE FORCE

[76] Inventor: Peter M. Nahirney, 10706 Meighen Crescent, North Battleford, Saskatchewan, Canada, S9A 3L1

[21] Appl. No.: 756,569

[22] Filed: Sep. 19, 1991

[51] Int. Cl.⁵ ............................................. H02K 29/00
[52] U.S. Cl. ..................................... 318/138; 318/254; 318/439; 310/156; 310/140
[58] Field of Search .................... 318/254, 138, 439; 310/40 R, 140, 152, 154, 156, 148–149, 254

[56] References Cited

U.S. PATENT DOCUMENTS

| | | | |
|---|---|---|---|
| 4,064,442 | 12/1977 | Garron | 318/254 |
| 4,270,075 | 5/1981 | Nygaard | 318/254 |
| 4,477,745 | 10/1984 | Lux | 318/254 |
| 4,574,225 | 4/1986 | Pershall et al. | 318/254 |
| 4,594,535 | 6/1986 | Morikawa | 318/254 |
| 4,723,100 | 2/1988 | Horikawa et al. | 318/254 |
| 4,761,590 | 8/1988 | Kaszman | 318/254 |
| 4,864,199 | 9/1989 | Dixon | 318/254 |

Primary Examiner—William M. Shoop, Jr.
Assistant Examiner—David Martin
Attorney, Agent, or Firm—Adrian D. Battison; Stanley G. Ade; Murray E. Thrift

[57] ABSTRACT

A dual voltage direct current permanent magnet brushless motor operated by sequential and alternate pulses to two rows of stator coils radially and equally positioned in the stato assembly to interact with two rows of permanent magnets equally spaced on the rotor. All the permanent magnets in one row are poled opposite to all the permanent magnets in the other row and total one less than the number of stator coils in each row. The reversal of poles of one row of permanent magnets on the rotor, along with the equal and opposite voltage permits the back electromotive force from a de-energizing stator coil in the first row to feed energy to the next stator coil positioned on the opposite site of the rotor (and vice versa) which interact with the reverse poled permanent magnet to produce only useful torque. Additional energy will be drawn from the battery as required to maintain the speed and torque requirement of the motor. The pulse to each stator is controlled by individual photocell detectors or Hall effect devices. The arrangement and control of the stator coils also permits power generation in the braking mode. The dual equal and opposite drive voltage permits the use of identical solid state switching devices in each side of the circuitry as well as utilization of the lowest possible peak inverse voltage rated devices as a result of the connection used between the stator coils.

13 Claims, 5 Drawing Sheets

DIRECT CURRENT MOTOR UTILIZING BACK ELECTROMOTIVE FORCE

BACKGROUND OF THE INVENTION

This invention relates to a direct current motor of the type which includes a plurality of permanent magnets mounted upon a rotor and a plurality of electromagnets mounted upon a stator arranged so that rotation of the rotor causes the permanent magnets to pass into cooperation with each of the electromagnets in turn and including means for applying voltage pulses to the electromagnets in timed sequence so that the cooperation between the permanent magnets and the electromagnets results in a force tending to rotate the rotor.

Conventional direct current motors of this type have previously been proposed but have a disadvantage of not utilizing the back electromotive force during commutation generated by the collapsing magnetic field at each coil after the voltage pulse is removed. This results in a reduced efficiency in that the energy present in the back electromotive force is merely dissipated.

SUMMARY OF THE INVENTION

It is one object of the present invention, therefore, to provide an improved direct current motor which is designed to utilize the back electromotive force. The invention uses a special design of rotor, efficient electromagnetic coil design together with high power permanent magnets, very low loss electromagnetic coil material and associated solid state switches and controls enabling an efficient pulsed motor design which recaptures some or all of the back electromotive force.

According to the invention, therefore, there is provided an electric motor comprising a stator, a rotor mounted for rotation relative to the stator about an axis, a first set of electromagnets mounted on the stator in equi-angularly spaced positions around the axis, a first set of permanent magnets mounted on the rotor in equi-angularly spaced positions around the axis and arranged such that rotation of the rotor causes each permanent magnet of the first set to pass sequentially into cooperating position with each in turn of electro magnets of the first set, the number of permanent magnets of the first set being different by an odd number from the number of electromagnets of the first set, means for feeding pulsed voltages to the electromagnets to cause a force on the permanent magnets tending to rotate the rotor about the axis, a second set of electromagnets mounted on the stator in equi-angularly spaced positions around the axis, a second set of permanent magnets mounted on the rotor at equi-angularly spaced positions around the axis and arranged such that rotation of the rotor causes each permanent magnet of the second set to pass sequentially into cooperating position with each in turn of electromagnets of the second set, the number of permanent magnets of the second set being different by an odd number from the number of electromagnets of the second set, means for feeding pulsed voltages to each of the electromagnets to cause a force on the permanent magnets tending to rotate the rotor about the axis, the second set being spaced from the first set such that the permanent magnets of each of the first and second sets cooperate only with the electromagnets of the first and second sets respectively, the poles of the permanent magnets of the first set being reversed relative to the poles of the permanent magnets of the second set such that in order to cause a tendency to rotate in the same direction, the voltage applied to said first set of electromagnets is of opposite polarity relative to the voltage applied to the second set of electromagnets, the number of electromagnets in the first set being equal to the number of electromagnets in the second set and the number of permanent magnets in the first set being equal to the number of permanent magnets in the second set, the electromagnets of the first set being angularly offset from the electromagnets of the second set and means for communicating current generated by the collapsing field of each electromagnet of each of one the sets to a respective one of electromagnets of the other one of the sets to tend to generate in said respective one of electromagnets of the other one of the sets said pulsed voltage.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
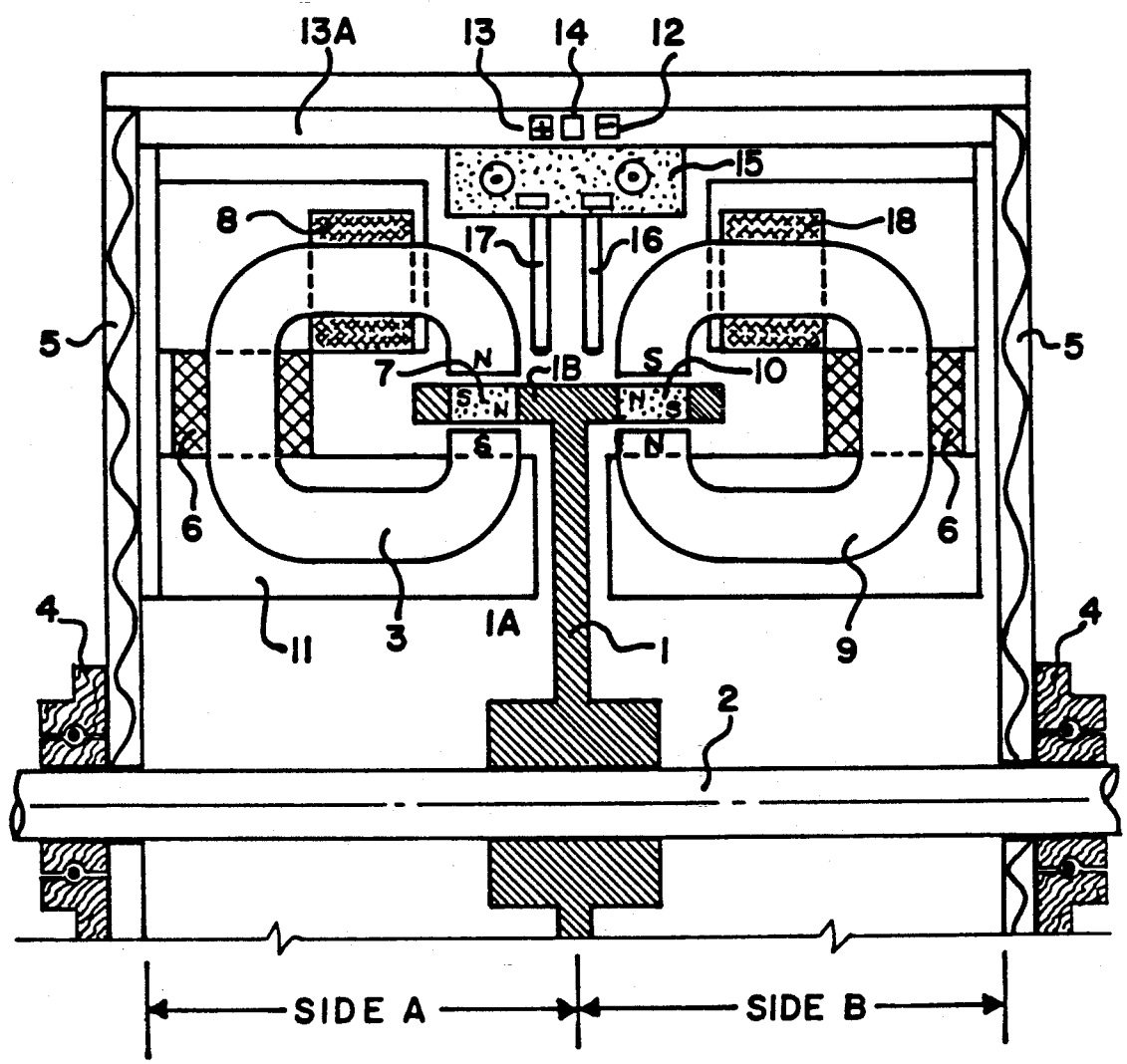
FIG. 1 is a schematic cross-sectional view through a motor according to the invention.

The motor of FIG. 1 comprises a rotor 1 including a shaft 2 mounted in bearings 4 on a stator 5. The rotor includes a support disc 1A upon which is mounted an outer cylindrical body 1B including two cylindrical portions extending axially of the disc 1A in opposed directions so as to define two axially spaced portions of the rotor.

In one of the portions is mounted a set of permanent magnets 7 and on the other of the portions is mounted a set of permanent magnets 10. It will be noted that the poles of the magnets 10 are inverted relative to the poles of the magnets 7.

The stator carries on mounting brackets 6 two sets of electromagnets indicated at 3 and 9 respectively. This set of electromagnets indicated at 3 is shown in side elevational view in FIG. 2. Thus it will be noted that the electromagnets of the set 3 are spaced at angularly spaced locations around the axis with equal spacing between the electromagnets. The electromagnets of the set 9 are similarly equally spaced around the axis but are offset relative to the electromagnets of the set 3 by an angle equal to one half the angle between the electromagnets. The same number of electromagnets are present in the set 3 as are present in the set 9. The number of permanent magnets 7 is equal to a number which is different from the number of electromagnets in that set by an odd number and preferably there is one less permanent magnet than the number of electromagnets.

As explained hereinafter each of the sets of electromagnets is supplied with voltage pulses so as to tend to cause a rotation effect of the rotor due to the cooperation between the permanent magnet and the electromagnet and due to the imbalance of the device caused by the difference in number between the permanent magnets and the electromagnets. Voltage is supplied to the set 3 through a bus 13 and relatively supplied to the set 9 from a bus 12. The bus is 12 and 13 together with a neutral bus 14 are mounted upon a cylindrical wall 13A forming part of the stator and surrounding the rotor.

Figure 4:
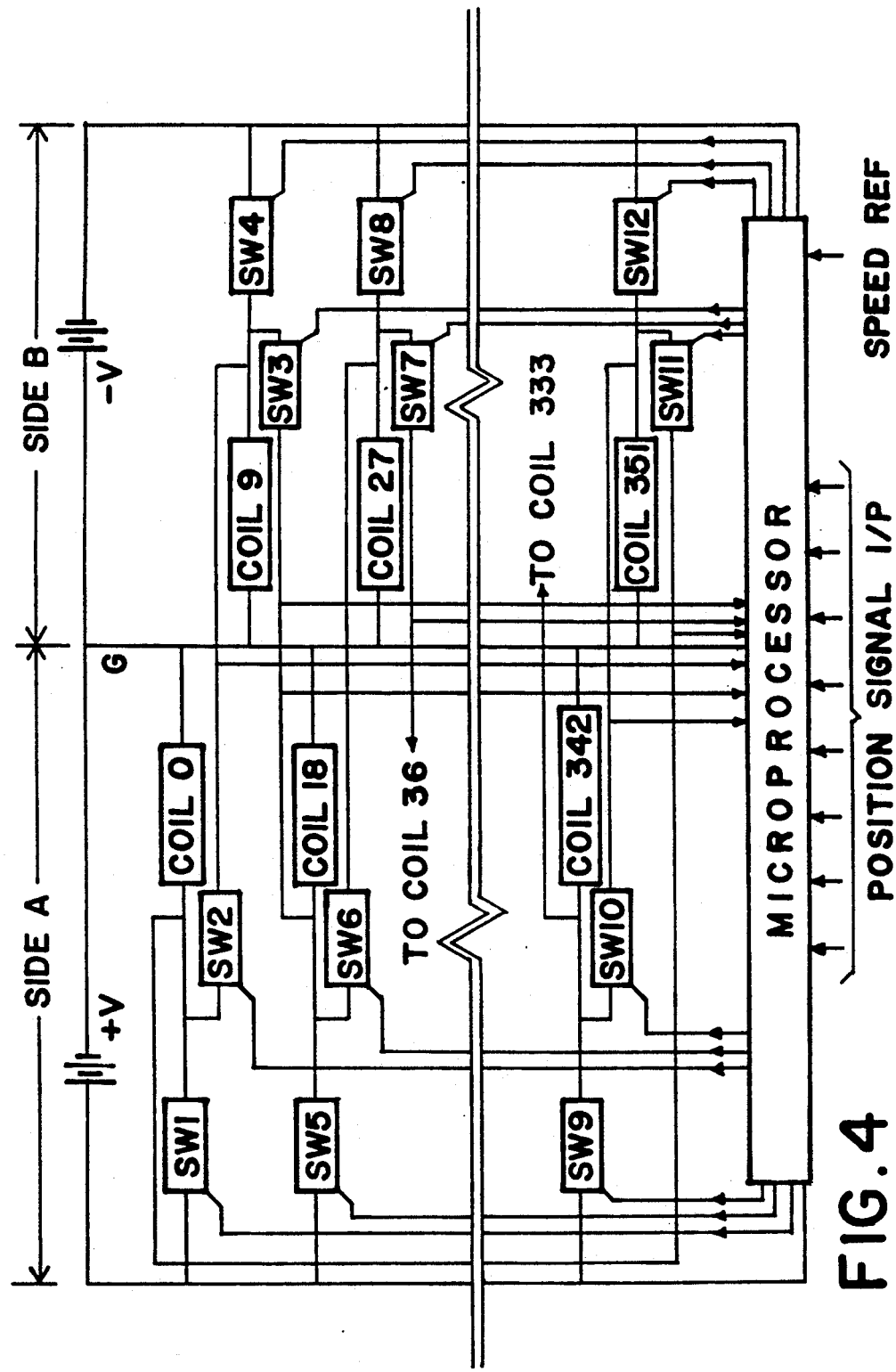
FIG. 4 is a schematic circuit diagram showing one part of the circuit for controlling the generation and communication of voltage pulses to the electromagnetic coils of the motor of FIG. 1.

Each electromagnet is associated with a respective one of a plurality of circuit boards 15 the details of which are shown in more detail in FIG. 4.

Each of the circuit boards 15 carries a location detecting sensor with one of the sensors being indicated at 16 in relation to the coil illustrated at 9 in FIG. 1 and another being shown at 17 in relation to the coil indicated at 3 in FIG. 1. Each of these position locating devices is arranged to locate the permanent magnet so that the timing of pulses to the coils of electromagnets can be controlled as explained hereinafter.

FIG. 1 is a typical cross section of the invention to show the relationship of the main components of this invention. For illustration purposes the electromagnetic coil 3 and electromagnetic coil 9 are shown in the same plane, however, in actuality one of these electromagnetic coils is behind or ahead of the other by the number of degrees equal to the total number of all electromagnetic coils divided by 360 degrees. The above comment also applies to the permanent magnets in the rotor, except that one permanent magnet is ahead or behind the other by the number of degrees equal to two less than the total number of electromagnetic coils divided by 360 degrees.

In one example the motor has a total of 40 electromagnetic coils and 38 permanent magnets hereinafter referred to as the 40/38 motor; however, it must be remembered that the motor can consist of any number of electromagnetic coils and the proportional number of permanent magnets. Different shapes, sizes and mounting orientations of the electromagnetic coils, different shapes, thickness and sizes and orientation of the permanent magnets; different rotor shape and sizes and as mentioned above different numbers of rotor/stator assemblies can be used to design a motor for various application.

The stator electromagnetic coils are evenly spaced around the rotor and fastened to the stator frame. The electromagnetic coils for a 40/38 motor are spaced at 360 divided by 40=9 degrees. Twenty electromagnetic coils are mounted on each coil gap surround the rotor which carries permanent magnets through the electromagnetic coil gaps.

Figure 2:
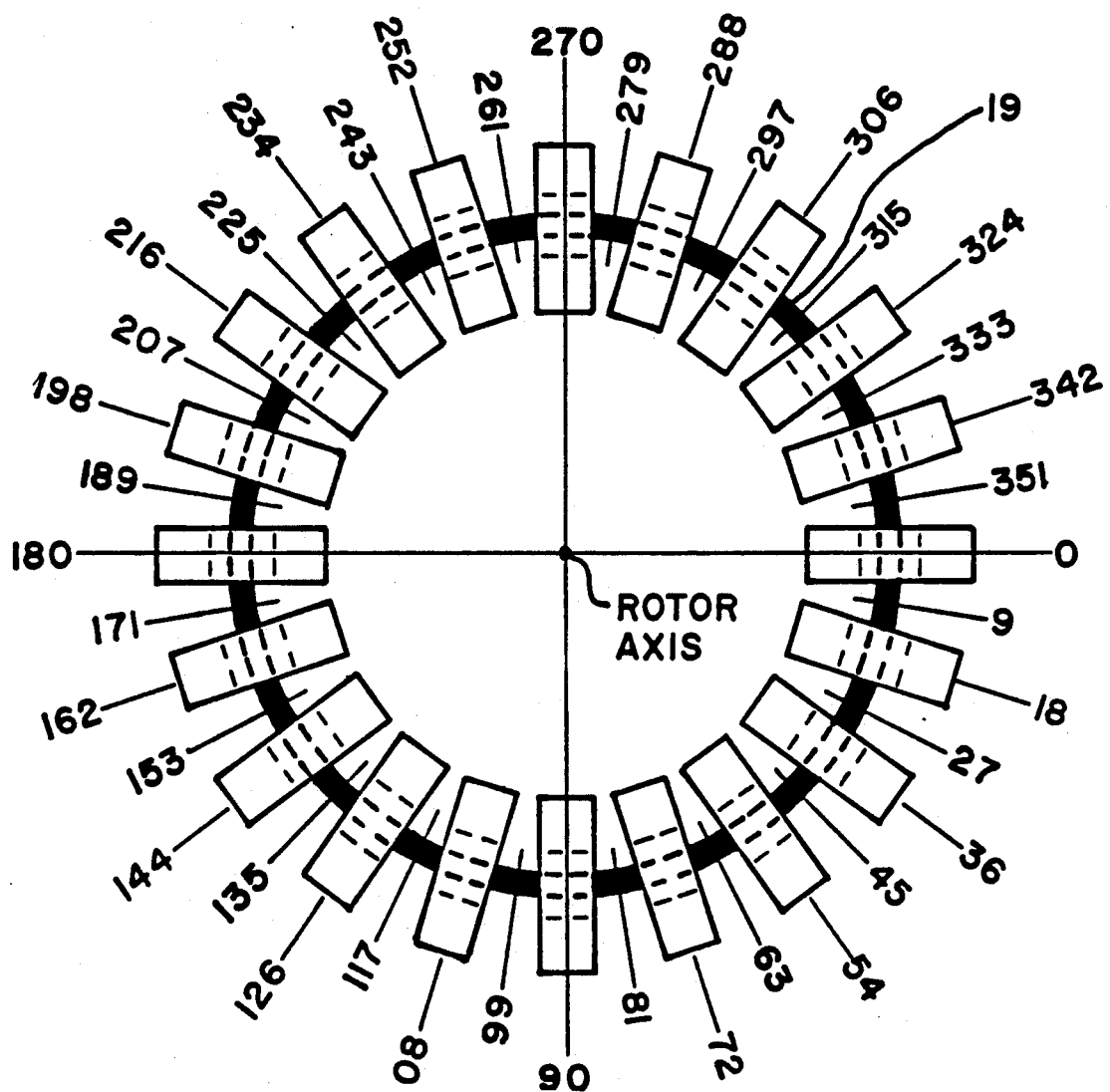
FIG. 2 is a schematic side elevational view of the stator of the motor of FIG. 1.

Each of the twenty are equally spaced (18 degrees) on one side of the stator (Side A) and the twenty other electromagnetic coils are spaced equally on the other side of the stator (Side B) but rotated so they are midway between the electromagnetic coils on the previous side. Refer to FIG. 2 for the actual degrees of each coil. Hereinafter the electromagnetic coils will be named after the position they occur in degrees. If the stator shown in FIG. 1 is viewed from the left hand side then all electromagnetic coils on Side "A" shall be the even number i.e. 0, 18, 36, 54, 72, 90, 108, 162, 180, 198, 216, 234, 252, 270, 288, 306, 324 and 342. Item 19 of FIG. 2 shows the orbital path of all permanent magnets through the gap in the electromagnetic coils. Only the centre line of the electromagnetic coils for Side "B" are shown on this drawing in order to distinguish between Side "A" and Side "B" coils. The Side "B" electromagnetic coils would be named 9, 27, 45, 63, 81, 99, 117, 135, 153, 171, 189, 207, 225, 243, 261, 279, 297, 315, 333, 351.

Assuming the motor operates in the attraction mode and the electromagnetic coils 3 on Side "A" are powered by a positive voltage and connected so that the outside of the electromagnetic coil gap is poled to be magnetically north, then all the 19 permanent magnets 7 in Side "A" of the motor are poled so the magnetic south is facing away from the centre of the rotor. The spacing of all permanent magnets would be 360 degrees divided by 38. The electromagnetic coils on Side "B" of the rotor are powered by a negative voltage and all the electromagnetic coils are connected so the outside gap of the electromagnetic coils are poled to be magnetically south then all the 19 permanent magnets in Side "B" of the motor would be poled so the magnetic north is facing away from the centre of the rotor. The rotor is brushless.

Figure 3:
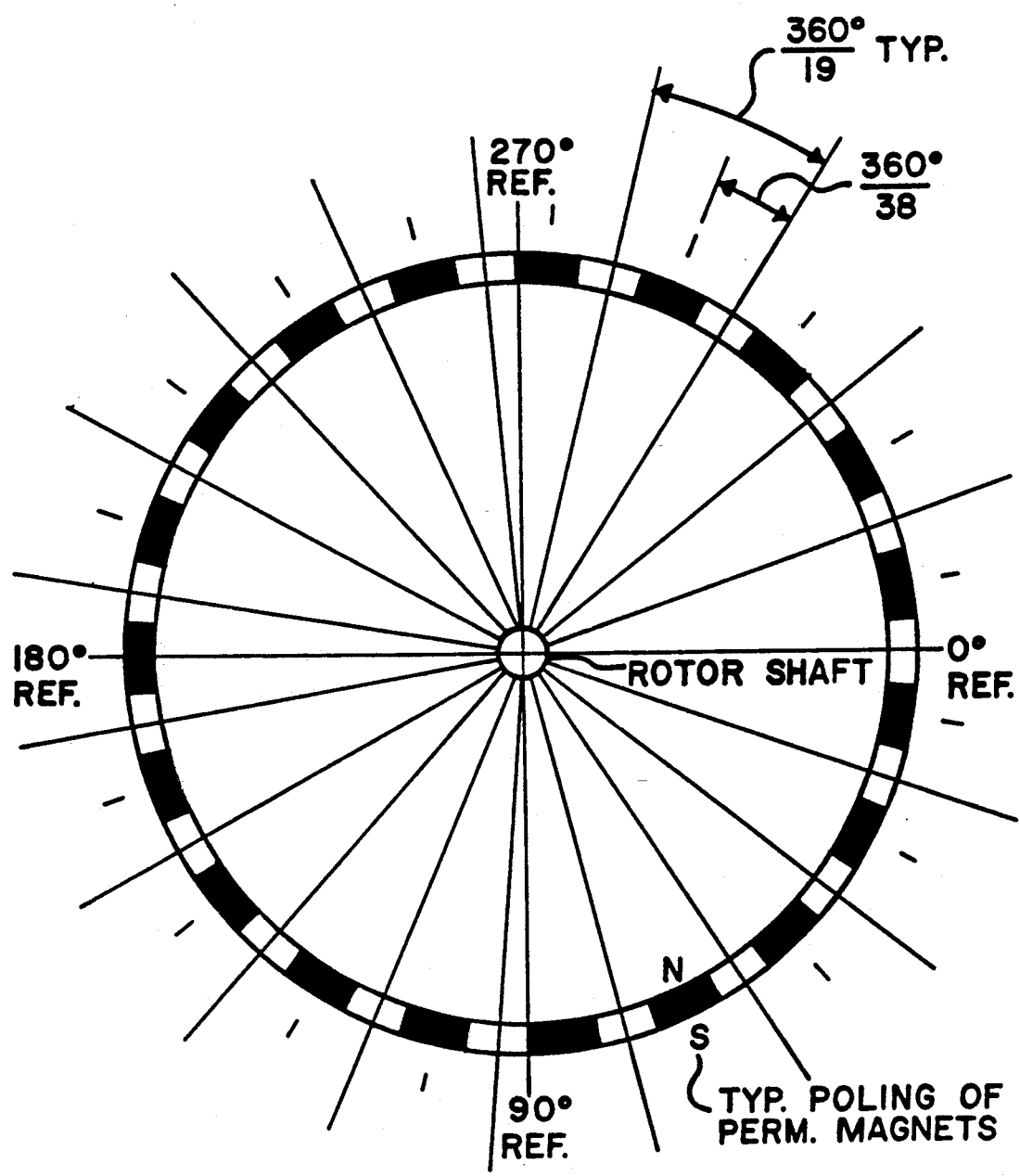
FIG. 3 is a schematic side elevational view of the rotor of the motor of FIG. 1.

FIG. 3 shows all Side "A" permanent magnets mounted in the rotor. Side "B" permanent magnets locations are identified by centreline locations only.

Turning now to FIG. 4, the left hand set of coils indicated at 3 in FIG. 1 are indicated on the left hand side of FIG. 4 as coils 0, 18 etc. through to coil 342. The coils on the right hand side indicated at coil 9, 27, through to coil 351 are equivalent to the set of coils on the right hand side indicated at 9 in FIG. 1. Each of the coils on the left hand side is connected to the bus 13 and to the neutral return 14 and each of the coils on the right hand side is connected to the bus 12 and to the neutral return 14. The communication of a voltage pulse from the respective bus is controlled through a switch. Thus for coil 0, the switch is indicated at SW1, for coil 18 the switch is indicated at SW5, for coil 342 the switch is indicated at SW9, for coil 9 the switch is indicated at SW4, for coil 27 the switch is indicated at SW8 and for coil 351 the switch is indicated at SW12. Each of the switches is gated under control of a microprocessor M which emits a signal to control as required the respective one of the switches SW1, SW5, SW9, SW4, SW8 and SW12 etc.. The microprocessor has input signals from each of the position sensors 16 and 17 indicated at "Position Signal I/F". In addition the microprocessor receives an input control for controlling the speed of the motor by manual or other independant actuation indicated at "Speed Ref I/F".

If the motor is operating in the attraction mode, the rotor will turn in the clockwise direction with reference to FIG. 2. The microprocessor is arranged to control the switches so that a power pulse is obtained every 9 degrees for every electromagnetic coil. Thus the position detector for coil 0 enables the gate to switch SW1 through the microprocessor M. The gate enable time must be less than the time required for the rotor to move 9 degrees for a given speed. The firing time period for SW1 will be determined by the speed requirements.

Figure 5:
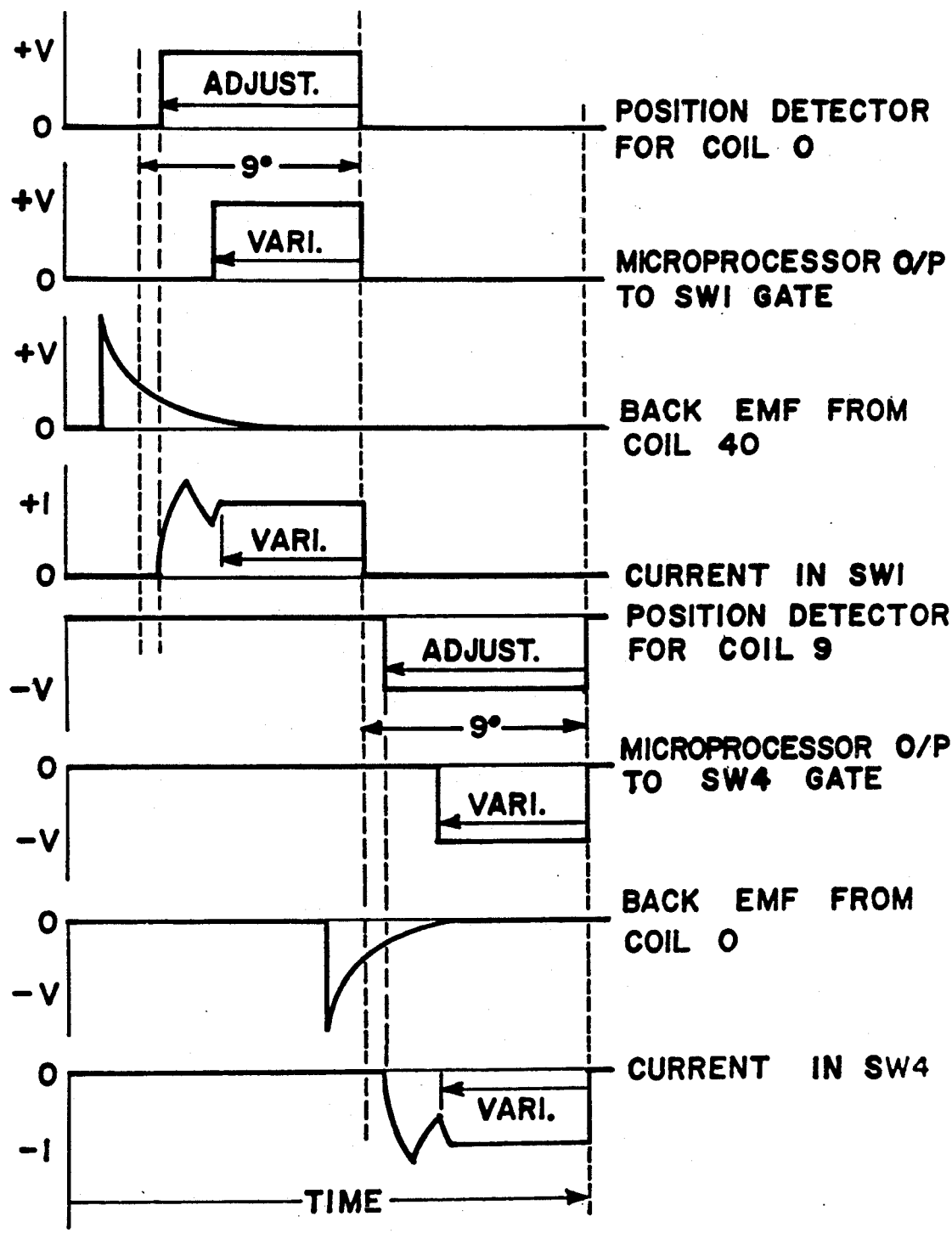
FIG. 5 is an illustration of the wave forms generated during operation of the motor of FIG. 1.

In FIG. 5 is shown the waveform for one cycle of coil 0 and coil 9. Thus is indicated the position detector for coil 0 and the position detector for coil 9 and specifically the signal therefrom. The microprocessor thus acts to control the switch SW1 and SW4 to generate a voltage pulse which is supplied to the coil 0 and coil 9 respectively.

When the switch SW1 is shut off, this causes the magnetic field in the coil 0 to collapse which will generate an electromotive force or a negative pulse. This is indicated as the back EMF from coil 0 in FIG. 5. The switch SW2 is then actuated by the microprocessor which detects the back EMF and thus current from the negative voltage pulse is communicated through the SW2 through the coil 9. As the coil 9 requires a negative voltage pulse, this negative voltage is added to the pulse from the bus 12 controlled by the switch SW4 as indicated as current in SW4 and this pulse is then communicated to the coil 9 to generate the required negative pulse therein.

Similarly as shown in the top part of FIG. 5, the back EMF from coil 351 is communicated through switch 11 to coil 0 for addition to the pulse generated through SW1.

Symetrically coil 18 cooperates with a switch SW6, coil 342 cooperates with a switch SW10 and coil 27 cooperates with a switch SW7 for communicating the back EMF voltage pulse to the next adjacent coil.

The switches shown in FIG. 4 are commercially available high power solid state switching devices such as SCRS, TRIACS, Transistors etc.. The circuit including the switches can include capacatitor and/or inductor arrangements arranged in conjunction with the switch circuits on the circuit board 15 to provide a shaping of the energy pulses obtained by the addition of the pulse from the next adjacent coil and the pulse from the bus to obtain the desired operating characteristics for the motor.

The speed of the motor is controlled by the shape and length of the pulse under control of the microprocessor. The polarity of the pulse can be changed by reversing the wiring of the system and this way the motor can be operated either in attraction or repulsion mode in that the poles of the electromagnets can be reversed and thus cooperate with the permanent magnets in the attraction or repulsion mode.

The circuitry can be modified so that dynamic braking can be provided by recharging the supply battery or by dumping the generated electrical energy into a resistive load. This is controlled by the microprocessor to generate voltage pulses as required for the dynamic braking.

The motor described can in principle be operated by standard commercial alternating current power providing a centre-tapped secondary transformer with the necessary output voltage is available.

The rotor/stator assemblies described herein can be mounted upon a single common shaft alternatively the arrangement can be split by the provision of separate shafts so that additional electromagnetic coil mounting space is made available to produce smaller diameter motors. Additional sets of coils and permanent magnets can be employed to provide additional power with a similar arrangement of communication of voltage pulses from the primary source and from the back EMF being provided.

The motor according to the present invention as described above has the following advantages;

1. The back electromotive force from a denergized electromagnetic coil is utilized to the maximum possible. Only the small voltage drop across the solid state switch which is driven into saturation by self based circuitry consumes a small percentage of the power.

2. The collection of the back electromotive force is the most efficient possible because the collapsing magnetic field uses the same windings and another set of solid state circuitry to steer the energy from the collapsing field to the next driven electromagnetic coil (reversed poled). Some other invention shave used separate coils but that type of arrangement results in a less efficient magnetic circuit.

3. The permanent magnets in the rotor eliminates the need for a commutator i.e. no frictional loss and no I R loss in the rotor conductors.

4. All electromagnetic coils work in the same driven direction and the back electromotive force is switched ahead to a reverse poled electromotive coil whose residual magnetic is already in the desired polarity, hence energy is not wasted in pole reversal of the magnetic material in the electromagnetic coil core.

5. The failure of any one and possibly more driven coils or solid sate circuitry will not result in motor failure, only reduced output.

6. The adjacent alternating sequencing of the electromagnet coil electrical drive circuits as set out in the invention permits very short conductor runs thereby minimizing magnetic pickup and conductor $I^2R$ loss.

7. The motor can be operated in an attraction or repulsion mode thereby rendering it bi-directional.

8. Circuitry can be provided to enable dynamic braking by operating the motor as a generator and recharging battery or steering the energy into a resistive load.

9. The design can be readily changed to meet the requirements of a wide range of application. Adjustable parameters include; rotor diameter, size of the permanent magnets and electromagnetic coils, orientation of the permanent magnets and electromagnetic coils and the number of rotor/stator assemblies on the same shaft.

10. Speed control by controlling the length of the drive pulse.

11. The dual equal and opposite voltage sources eliminates the need to match solid state devices such as NPN and PNP transistors, identical devices can be used throughout.

12. The motor is capable of high output torque due to the favourable angle of interaction between the electromagnetic and permanent magnet magnetic fields.

13. The normal problems of high peak inverse voltages generated by a collapsing magnetic field is minimized by self-biassing a solid state switching device so the input impedance the back electromotive force encounters is the same as output impedance for the electromagnetic coil in which the magnetic field is collapsing (all the electromagnetic coils are constructed the same).

14. Maximum energy transfer of the back electromotive force occurs because the output impedance is equal to the input impedance.

In an alternative arrangement (not shown), the system is reversed so that the permanent magnet in the two sets described above are mounted on the stator while the corresponding electromagnet sets are mounted on the rotor.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An electric motor comprising stator means, rotor means mounted for rotation relative to the stator means about an axis, a first set of electromagnets mounted on one of the rotor means and the stator means in equi-angularly spaced positions around the axis, a first set of permanent magnets mounted on the other of the rotor means and stator means in equi-angularly spaced positions around the axis and arranged such that rotation of the rotor means relative to the stator means causes each permanent magnet of the first set to come sequentially into cooperating position with each in turn of electromagnets of the first set, the number of permanent magnets of the first set being different by an odd number from the number of electromagnets of the first set, first feeding means for feeding pulsed voltages to the electromagnets of the first set to cause a force on the permanent magnets of the first set tending to rotate the rotor means about the axis in a predetermined direction, a second set of electromagnets mounted on one of the rotor means and the stator means in equi-angularly spaced positions around the axis, a second set of permanent magnets mounted on the other of the rotor means and stator means at equi-angularly spaced positions around the axis, and arranged such that rotation of the rotor means causes each permanent magnet of the second set to come sequentially into cooperating position with each in turn of electromagnets of the second set, the number of permanent magnets of the second set being different by an odd number from the number of electromagnets of the second set, second feeding means for feeding pulsed voltages to each of the electromagnets of the second set to cause a force on the permanent magnets of the second set tending to rotate the rotor about the axis in said predetermined direction, the electromagnets of the second set being spaced from the first set such that the permanent magnets of each of the first and second sets cooperate only with the electromagnets of the first and second sets respectively, the poles of the permanent magnets of the first set being reversed relative to the poles of the permanent magnets of the second set, the voltage applied to said first set of electromagnets being of opposite polarity relative to the voltage applied to the second set of electromagnets, the number of electromagnets in the first set being equal to the number of electromagnets in the second set and the number of permanent magnets in the first set being equal to the number of permanent magnets in the second set, the electromagnets of the first set being angularly offset from the electromagnets of the second set and means for communicating current generated by the collapsing field of each electromagnet of each one of the sets to a respective one of electromagnets of the other one of the sets to tend to generate in said respective one of electromagnets of the other one of the sets said pulsed voltage.

2. The motor according to claim 1 wherein the number of permanent magnets of the first set is less than the number of electromagnets of the first set by one.

3. The motor according to claim 1 wherein the first and second sets are axially spaced.

4. The motor according to claim 1 including microprocessor controlled switch means controlling said voltage pulses and controlling communication of said current.

5. The motor according to claim 4 wherein the switch means is solid state.

6. The motor according to claim 1 wherein the voltage pulses for the first set are generated from a DC voltage and wherein the voltage pulses for the second set are generated from an equal DC voltage of opposite polarity.

7. The motor according to claim 1 wherein said communicating means is arranged to communicate said current from said each electromagnet to said electromagnet of the other one of the sets which is next adjacent in an angular direction to said each electromagnet.

8. The motor according to claim 1 including means for adjusting the length of the voltage pulses.

9. The motor according to claim 1 wherein said first and second feeding means are each arranged to apply voltage to the respective electromagnets, which voltage can be adjusted from a positive voltage to a negative voltage to change the cooperation between the permanent magnets and the electromagnets between a repulsion mode and an attraction mode.

10. The motor according to claim 1 including position location means for detecting the relative positions between the permanent magnets and the electromagnets for timing of the voltage pulses.

11. The motor according to claim 10 wherein the position location means includes a hall effect device.

12. The motor according to claim 10 wherein the position location means includes a photo cell.

13. The motor according to claim 1 wherein said first and second feeding means each include means for shaping the pulses.

* * * * *